United States Patent [19]
Quattrocchi et al.

[11] Patent Number: 5,655,701
[45] Date of Patent: Aug. 12, 1997

[54] METHOD FOR REPAIRING AN ABRADABLE SEAL

[75] Inventors: Louis S. Quattrocchi, Rocky Hill; Walter H. LaPointe, Enfield, both of Conn.

[73] Assignee: United Technologies Corporation, Hartford, Conn.

[21] Appl. No.: 500,377

[22] Filed: Jul. 10, 1995

[51] Int. Cl.⁶ .............................. B23K 31/02; B23K 1/20
[52] U.S. Cl. ....................... 228/119; 29/899.1; 29/402.13
[58] Field of Search ........................ 228/119; 29/889.1, 29/889.22, 402.07, 402.13

[56] References Cited

U.S. PATENT DOCUMENTS

| | | | |
|---|---|---|---|
| 3,053,694 | 9/1962 | Daunt et al. | 29/889.1 |
| 4,655,383 | 4/1987 | Fournes et al. | 228/119 |
| 4,808,055 | 2/1989 | Wertz et al. | 29/889.1 |
| 5,185,924 | 2/1993 | Fraser | 29/889.1 |
| 5,359,770 | 11/1994 | Brown et al. | 29/889.1 |

*Primary Examiner*—Samuel M. Heinrich
*Assistant Examiner*—Jeffrey T. Knapp
*Attorney, Agent, or Firm*—Gene D. Fleischhauer

[57] ABSTRACT

Repairing an abradable seal includes the step of removing only a portion of the abradable material 38. Various detailed steps have been developed that speed repair time and decrease repair costs over methods removing all abradable material.

7 Claims, 4 Drawing Sheets

METHOD FOR REPAIRING AN ABRADABLE SEAL

TECHNICAL FIELD

This invention relates to axial flow rotary machines, and more particularly to a method for repairing an abradable seal for a flow directing assembly of the non-rotating type, such as the stator assembly of a gas turbine engine.

BACKGROUND OF THE INVENTION

The compression section of a gas turbine engine has a stator structure and a rotor structure. The rotor structure is disposed about an axis of rotation which extends axially through the compression section. The stator structure is spaced radially from the rotor structure and circumscribes the rotor structure. A flow path for working medium gases extends through the engine and is bounded by the stator structure. Flow directing surfaces are disposed in the flow path to compress the gases in stages (rotor structure) and to direct the gases between compression stages (stator structure).

One example of flow directing surfaces in the rotor structure are the surfaces on each array of rotor blades. The rotor blades extend outwardly from the rotor structure and do work on the incoming gases to compress the gases. Arrays of stator vanes extend inwardly from the stator structure into proximity with the rotor structure. The stator vanes each have a flow directing surface to orient the gases after the gases pass through each stage of rotor blades.

The rotor blades extend into close proximity with the stator structure to minimize leakage around the tips of the rotor blades. Abradable seals are disposed about the interior of the stator structure in close proximity to the rotor structure. These seals block the working medium gases from leak paths around the flow directing surfaces. The stator structure has, for example, an outer abradable seal which extends circumferentially about the tips of the rotor blades to provide a seal at the blade tips. The arrays of stator vanes have an inner abradable seal which extends circumferentially in close proximity to a projecting surface on the rotor assembly, such as a knife edge seal element, to provide a seal at the vane tips. In both cases, it is expected that the rotor assembly as it rotates will cut sealing grooves in the abradable material to minimize any gap under operative conditions. After operation of the gas turbine for a period of time, the abradable material is replaced to repair the seal and insure efficient operation of the engine.

One example of an abradable seal is formed by bonding a layer of porous abradable material, such as fiber metal, having interconnected pores to an arcuate support ring. The support ring is commonly referred to as the substrate. The fiber metal consists of randomly interlocked metal fibers in the form of a sintered and pressed sheet or a sintered and rolled sheet. One satisfactory fiber metal sheet is FELT-METAL® fiber metal available from the Technetic Division of the Brunswick Corporation, DeLand, Fla. One typical bonding material is braze material such as AMS 4777 (Aerospace Material Specification) braze material. Another abradable seal material which might be formed as honeycomb filled with a porous, abradable material such as FELTMETAL® fiber metal.

The first step in replacing the abradable material is to remove only the abradable material or the abradable material and braze material. Two examples of methods for removing abradable material, such as fiber metal or honeycomb filled with fiber metal, are shown in U.S. Patents assigned to the assignee of the present invention. One example is shown in U.S. Pat. No. 5,293,717 issued to Snyder et al. entitled "Method For Removal Of Abradable Material Gas Turbine Engine Air Seals". Snyder suggests using abrasive machining to remove abradable material, such as fiber metal or honeycomb, down to the bond interface between the abradable material and the support ring or substrate (See Col. 4, ll. 22–34). U.S. Pat. No. 5,167,721, issued to McComas et al. entitled "Liquid Jet Removal Of Plasma Spray And Sintered", discloses the use of a water jet under high pressure to remove any coating which has a strength less than that of the substrate by adjusting the pressure of the water nozzle. It is noted that the pressure may be adjusted such that it removes the top coat without bond coat damage, or the top coat and bond coat without substrate damage, allowing reuse of the bond coat and substrate or the substrate respectively.

The method of removal of the abradable material that was employed prior to the subject invention uses abrasive machining to completely remove the abradable material and the braze before brazing new fiber metal or, any material attached to the substrate such as honeycomb filled with fiber metal. This causes an occasionally significant loss of parent material in the substrate of 10–15 mils for an abradable seal having an approximate 30 inch diameter with a thickness of fiber metal of 25 mils. Although the machined surface provides an excellent bonding surface because the abradable material and braze have been removed, it requires additional machining time and decreases part life because parent metal is being removed from the surface.

In some applications, only a portion of unfilled honeycomb has been removed before brazing new, unfilled honeycomb to the remaining honeycomb. However, all porous, abradable material has been consistently removed, in part, because of the weakness of the porous structure. Thus, both U.S. Pat. No. 5,293,717 and U.S. Pat. No. 5,167,721 suggest methods of removing all of the abradable material or all of the abradable material and braze. Both of these methods work well but may require extensive machining to remove the material or may risk injury to the parent material because of unexpected variations in the curvature of the parts given the small tolerances connected with removing all of the applied braze. For example, the thickness of the braze layer may be as little as eight (8) mils in the construction described above having an abradable material with a thickness of only twenty-five (25) mils on a radius of about thirty (30) inches.

Accordingly, scientists and engineers working under the direction of Applicants' assignee have sought to develop a repair process for replacing porous, abradable seal material which reduces the amount of machining and minimally impacts the service life of the part by reducing the loss of substrate material.

DISCLOSURE OF INVENTION

This invention is in part predicated on the realization that seals of porous abradable material having a wicking capability for a bond material, such as braze, do not require complete removal of the abradable material prior to replacing the seal material.

According to the present invention, a process for restoring an abradable seal having an abradable material attached by a bond material to a substrate, the abradable material being porous and having a wicking capability for the bond material, includes the steps of removing only a substantial portion of the abradable material leaving behind a residue of bond material and abradable material which decreases removal time, materials cost, and increases tolerances available to avoid accidental removal of the substrate material.

In accordance with one embodiment of the present invention, the step of removing the seal material includes leaving a residue of abradable material and braze material of a predetermined given thickness and the process includes disposing a thickness of new bond material adjacent the residue which is less than twice the thickness of the residue and providing a layer of new abradable material over the new bond material for attachment to the substrate through the bond material in the residue.

A primary feature of the present invention is the step of removing only a portion of the porous abradable material leaving behind a residue of abradable material and bond material. Another feature is the extent of coverage by bond material over the parent material after completing the step of removing the abradable material. Another feature is the step of disposing a thickness of bond material that is less than the original thickness of bond coat material between a substrate and the replacement abradable seal material. In one embodiment, the parent material of the substrate is completely covered. In another embodiment, where removal of the bond material is inadvertent, the depth of removal of parent material is less than 20% of the thickness of the abradable material. In some applications the depth of removal of parent material is less than 10% of the depth of abradable seal.

A primary advantage of the present invention is the reduced effort and time needed to repair an abradable seal which results from leaving a residue of bond material and porous abradable seal material on the substrate and attaching the replacement abradable material to the residue. Another advantage of the present invention is the extended part life which results from avoiding significant removal of parent material from the substrate because of the thickness of the residue material between the removal device and the substrate. Still another advantage is the durability of the repaired abradable seal which results from wicking of the bond material through the pores of the abradable material to attach the replacement abradable material to the residue of abradable material and bond material. Still another advantage of the present invention is the reduced material costs for a given thickness of bond coat material which results from using the bond material in the residue and new bond material to attach the new abradable material to the substrate.

The foregoing and other features and advantages of the present invention will become more apparent from the following description and accompany drawings.

BEST MODE FOR CARRYING OUT THE INVENTION

Figure 1:
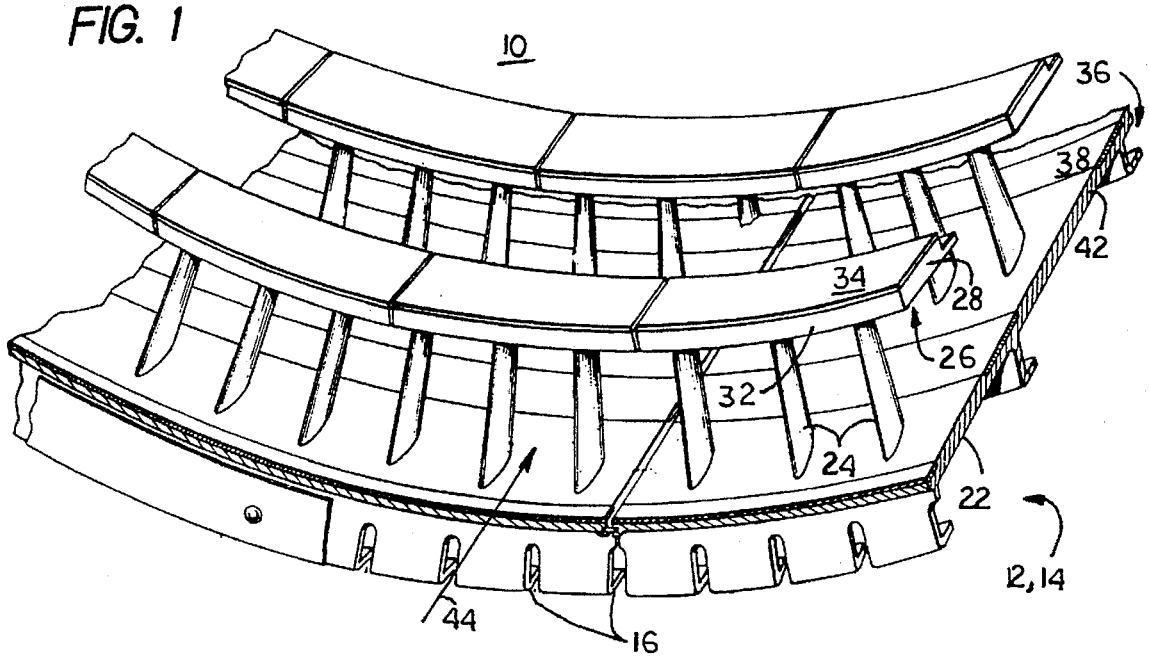
FIG. 1 is a partial perspective view of two adjacent arcuate segments which form a portion of the inner case of the compression section of a gas turbine engine.

A gas turbine engine embodiment of the present invention is illustrated in FIG. 1. The engine includes a compression section 10 of which a portion is shown. The compression section includes a stator assembly, such as an inner case 12. The inner case has a flow directing assembly 14 having arcuate segments 16 circumferentially adjacent one to the other.

Each arcuate segment has a support ring 22. A plurality of vanes, as represented by the vanes 24, extend radially inwardly from the support ring. Each vane has flow directing surfaces. Each arcuate segment has a first arcuate seal 26 which is attached to the plurality of stator vanes and which cooperate with the rotor assembly (not shown) to block the leakage of working medium gases past the vanes. The first arcuate seal is formed of a porous, abradable material such as fiber metal, or honeycomb filled with fiber metal. Each first seal includes a substrate 28 for supporting the abradable material. A bond material 32 such as braze material is disposed between the abradable material 34 and the substrate.

A second arcuate seal 36 is outwardly of the first arcuate seal. The second arcuate seal includes an abradable seal material 38 such as fiber metal, disposed in the support ring 22. A portion of the support ring 22 outwardly of the seal forms the substrate 42 for the second arcuate seal. During operation of the gas turbine engine, working medium gases are flowed along a flow path 44 which extends axially through the flow directing assemblies (stator vanes 24) which extend inwardly from the support ring 22. The working medium gases are driven through the compression section by a rotor assembly (not shown). The rotor assembly carries knife edges or blade tips (not shown) which extend into close proximity with the arcuate seals 26,36 to prevent the working medium gases from leaking from the flow path and around clearances between the rotor assembly and the stator assembly. In some constructions, the rotor knife edge or rotor blade tips are intended to run with line-on-line contact with the abradable material of the seals to provide a minimal gap therebetween. Some constructions are designed such that the tips of the rotor blades or the knife edges abrade the seal material under normal operative conditions to minimize the clearance gap. In other constructions, occasional rubbing contact between the rotating knife edges or blade tips and the seal material result in abradable removal of the seal material. After an extended period of operation, the seal material is replaced to restore the operative clearances to the original condition.

The method of replacing the porous, abradable seal includes the steps of removing a portion of the abradable seal material leaving behind a residue of bond material and abradable material, and disposing a layer of bond material, such as AMS 4777 braze material, adjacent the abradable seal material and the substrate.

Figure 2:
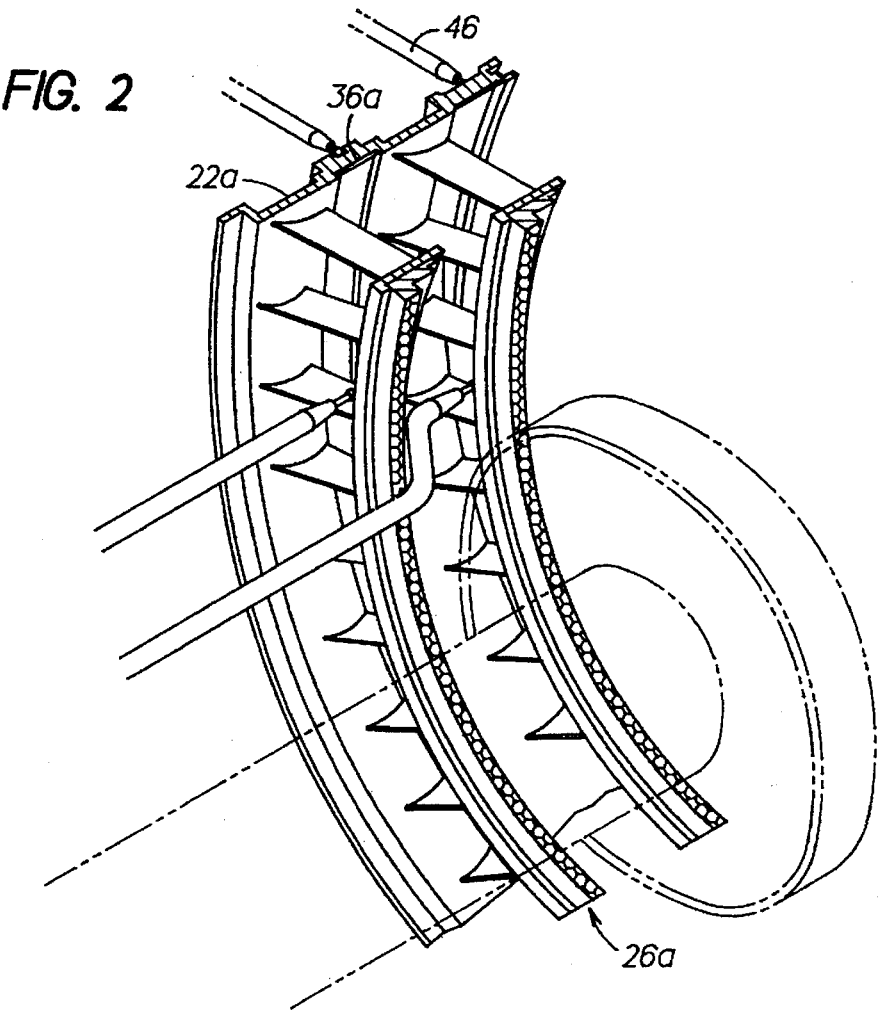
FIG. 2 is a perspective view of a single arcuate segment which is an alternative embodiment of the segment shown in FIG. 1 showing the relationship of the arcuate seal segment to a machining system for removing an abradable seal.

FIG. 2 is a partial perspective view of an alternate embodiment of the arcuate segment shown in FIG. 1. In this embodiment, the first (inner) arcuate seal 26a is formed of honeycomb filled with fiber metal. The second arcuate seal 36a is formed of fiber metal. The first arcuate seal and the second arcuate seal are removed by the method of surface abrasive machining (SAM). In the surface abrasive machining step, a portion of the fiber metal and the honeycomb filled with fiber metal are each removed by grinding. The filled honeycomb and the fiber metal are each ground down to a predetermined thickness which includes a portion of filled honeycomb for the first (inner) seal and a portion of the fiber metal material for the second (outer) seal. Each of these portions is attached to the parent material or substrate by braze material. One method for performing surface abrasive machining is disclosed in U.S. Pat. No. 5,293,717 issued to Snyder the disclosure of which is incorporated herein by reference.

As discussed in the Snyder patent, probes 46 are used to gather positional data. The data is used to establish reference surfaces for the abrasive machining operation. The reference surfaces are used to guide an abrasive machine (shown in phantom). Occasionally, the machining operation may cause a slight removal of parent material (such as 1–5 mils) for a fiber metal configuration having a height of 25 mils on a radius of about thirty (30) inches. This may occur in parts, for example, where the part has been so severely distressed that it falls outside the normal tolerance variation even for distressed parts. These parts nevertheless may be repairable but the same operation does cause a small removal of parent material.

The amount of parent material that is removed from the substrate is much smaller in comparison to methods such as are discussed in U.S. Pat. No. 5,293,717 where the abradable material is removed to the bond interface. In the present method, the porous, abradable material is not entirely removed which provides an additional thickness of abradable material to accommodate tolerance variations. Thus, the removal of a parent material may be reduced from depths of 5–15 mils to a depth of less than 5 mils and typically approximately 2 mils.

Figure 3:
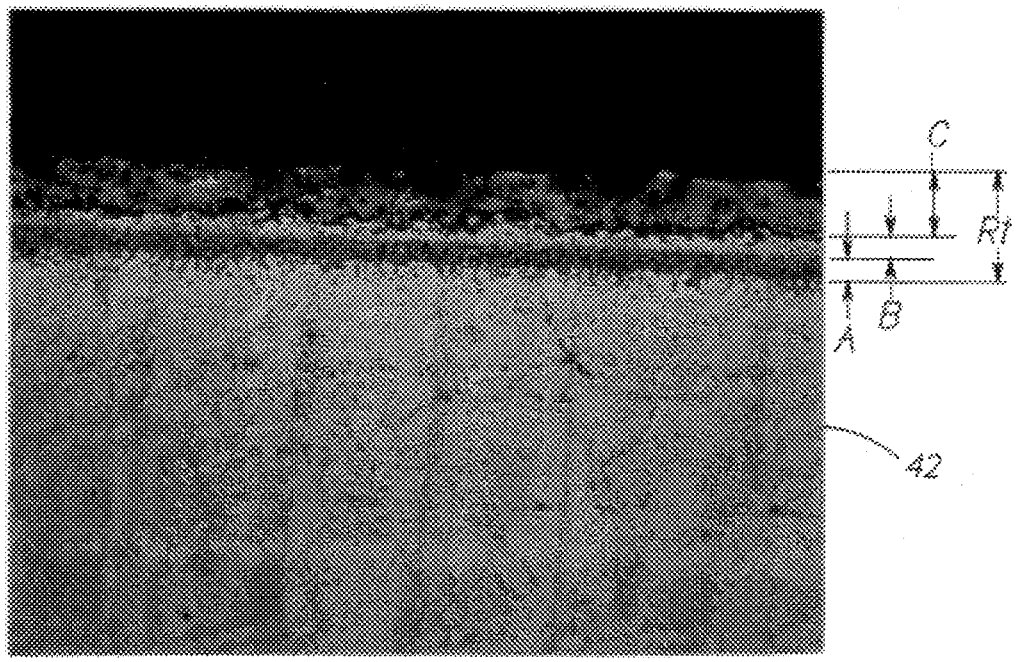
FIG. 3 is a photomicrograph magnified 100 times to show the relationship of a bond material and a porous abradable material to the parent material of the substrate after the step of removing the abradable material with an abrasive machining machine.

FIG. 3 is a photomicrograph showing the effect of SAM removal of a portion of the fiber metal (such as FELT-METAL® fiber metal) from an abradable seal having a bond material formed by braze material. As shown in FIG. 3, the original braze material has diffused into the parent material in zone A. The braze material located in zone B has been wicked by capillary attraction into the fiber metal to form zone C. Thus, the brazed material extends into the fiber metal and into the parent material to a thickness $R_r$ in the abradable seal after removal of a portion of the abradable material. This braze material extending into the fiber metal by capillary action provides a base to which additional braze material and an additional layer of fiber metal may be attached as is discussed below.

Another advantage results from using the removal techniques illustrated in U.S. Pat. No. 5,167,721 issued to McComas et al in comparison to the SAM process. As discussed in McComas, the disclosure of which is incorporated herein by reference, a pressurized water jet is used in the removal operation. In the present invention, the water jet is used to remove a portion of the fiber metal. This insures that only a portion of the abradable fiber metal is removed and very little of the braze, which insures that braze material extends over the entire substrate. As a result, the parent material stays coated with braze material avoiding the need for plating such a surface in those type of braze furnaces which require isolation of the parent material from contact with the atmosphere during brazing. In both the SAM process and the water jet process, removing only a portion of the abradable material results in reduced machining time and an associated saving in machining expense.

Figure 4:
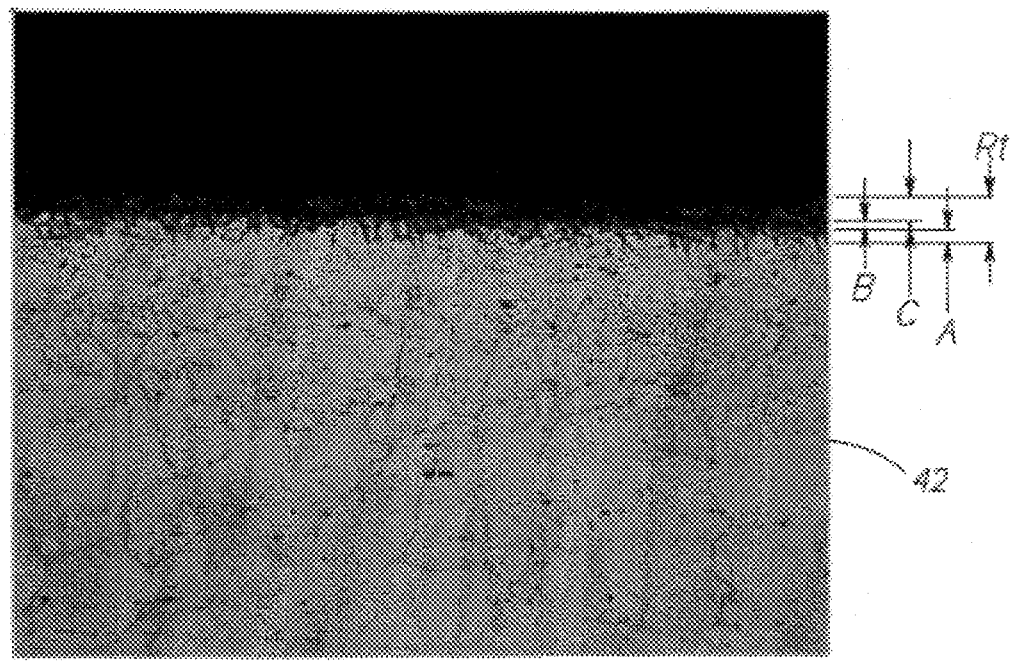
FIG. 4 is a photomicrograph magnified 100 times to show the relationship of a bond material and a porous abradable material to the parent material of the substrate after the step of removing the abradable material with a water jet.

FIG. 4 is a photomicrograph of an abradable seal material after removal of the fiber metal using a water jet. As shown in FIG. 4, the substrate is penetrated by the braze material in zone A to some extent and pure braze material (zone B) extends outwardly and into the fiber metal (zone C) of the abradable seal. Again, the braze material which has been drawn up by capillary attraction into the fiber metal (zone C) provides a base for attaching an additional braze layer and additional layer of fiber metal during the repair process. Thus, the abradable material is removed to an amount which permits entry of the new braze material into the abradable material to an extent that permits the new braze material to bond to the residue braze material.

Figure 5:
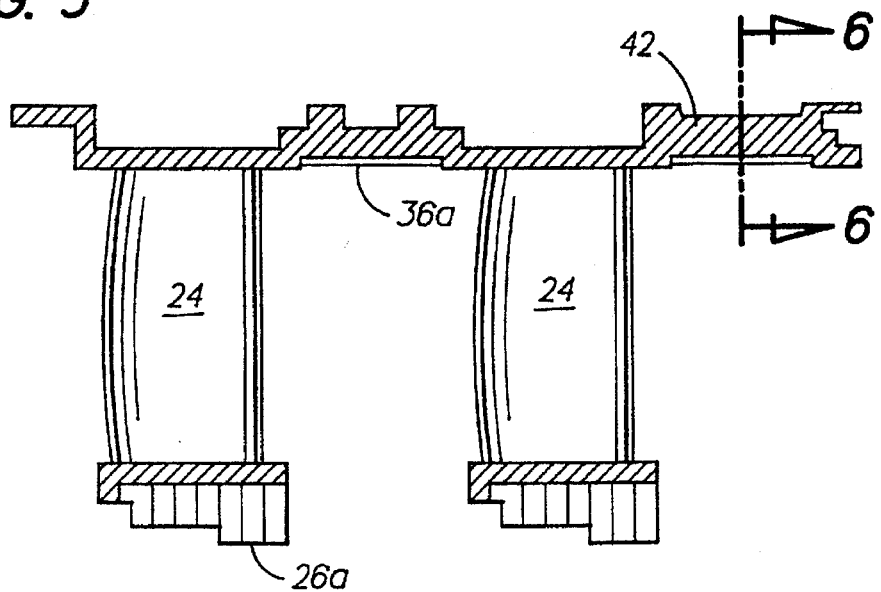
FIG. 5 is a sectional view of a portion of the arcuate segment shown in FIG. 2 taken along the lines 5—5 of FIG. 2 showing a porous, abradable material after the step of removing a portion of the abradable material.

FIG. 5 is a side elevational view of the outer air seal 26a and the inner air seal 36a after completion of the step of removing abradable material (fiber metal) from the remainder of the seal material. As a result, the substrate surface now has a residue layer of braze and braze/abradable seal material attached to the substrate 42.

Figure 6:
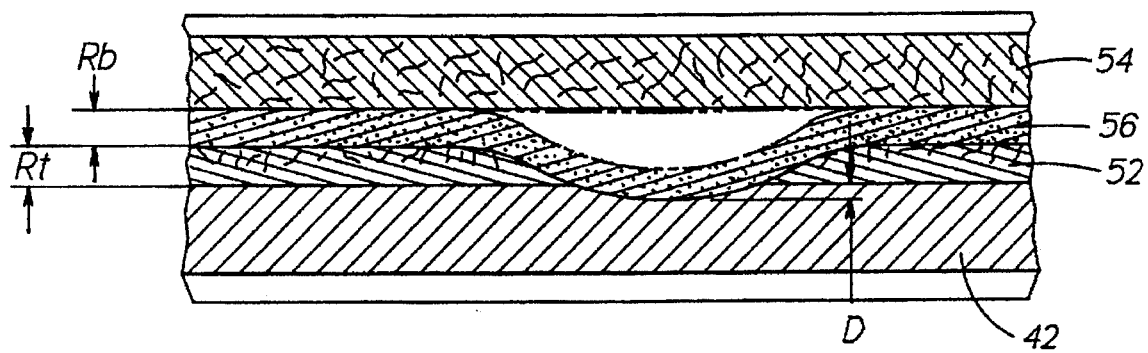
FIG. 6 is a view of a portion of the stator assembly shown in FIG. 5 showing the relationship of the parent material of the substrate, the residue layer of bond material (braze) and abradable material, a layer of bond material (braze) tape and a layer of replacement abradable material.

FIG. 6 is a cross-sectional view taken along the lines 6—6 of FIG. 5 of a portion of the abradable outer seal 36a with the orientation of the substrate rotated 180 degrees to face in the upward direction instead of the downward direction. As shown in FIG. 6, the substrate 42 has a small scallop-like indentation having a depth D (exaggerated for purposes of illustration) resulting from surface abrasive machining. The method includes leaving behind a residue layer braze/abradable material 52 adjacent the substrate which is attached to the substrate 42. The layer of porous, abradable material and braze material is formed by the surface preparation of water jet removal of the seal material or surface abrasive machining of the material. A layer of abradable seal material 54, such as fiber metal, is spaced from the braze and fiber metal residue. A tape of braze powder and a volatile binder 56 having a thickness $R_b$ is disposed between the abradable fiber metal layer and the braze/abradable material residue. The tape has a thickness which is less than twice the thickness of $R_b$ of the residue. The tape extends into the scallop-like depression. Upon heating of the structure, braze material fills the void formed by the scallop-like depression (which is greatly exaggerated in FIG. 6) and bonds the fiber metal across its surface to the layer of braze/abradable fiber metal residue adjacent the parent material.

Figure 7:
FIG. 7 is a photomicrograph magnified by 100 times showing the relationship between the parent material of the substrate, the residue of bond material and abradable material, the new bond material and replacement abradable material.

FIG. 7 is a photomicrograph magnified one hundred (100) times of the resulting structure after completion of the process of repair. Whether a SAM process or a water jet process is used to remove a portion of the abradable material, a sufficient amount of abradable material is removed such that the wicking action which results from capillary attraction does not penetrate the new abradable material to an unacceptable height. The braze material is relatively hard and durable in comparison to the abradable material, whether it is filled honeycomb or fiber metal, and would result in a destructive loss of material on knife edge seals and rotor blade tips were the braze material to contact the knife edge seal or the rotor blade tip during a destructive interaction.

Upon heating of the assembled components as shown in FIG. 6, the replacement braze material 56 diffuses into the abradable seal material (fiber metal) 54 or 52 as a result of capillary forces acting on the braze material. Zone A represents the layer of original braze material that is diffused into the parent material. Zone B shows the layer of braze/abradable seal (fiber metal) material residue. Zone C represents the replacement braze material layer. Zone D shows the layer of replacement abradable seal material (fiber metal) with replacement braze material diffused into the abradable seal material.

A good bond is formed between the replacement braze material and the braze material in the braze/fiber metal residue layer. A good bond is formed because capillary forces cause the braze material to extend through the porous fiber metal to the new interface with the replacement braze material. This bond is formed even though a reduced amount of machining is needed to prepare the surface of braze/fiber metal material to receive the layer of replacement braze material. As a result of this construction, the abradable seal material is supported from the parent material in part by using old braze material. This reduces the requirement for new braze material by reusing the old braze material to bond the new braze material to the parent material with a resulting structure that has the requisite strength, and requires less braze material (for a given depth of braze material) to attach the felt metal to the parent material.

Although the invention has been shown and described with respect with exemplary embodiments thereof, it should be understood by those skilled in the art that various changes, omissions, and additions may be made thereto, without departing from the spirit and scope of the invention.

What is claimed is:

1. A process for repairing an abradable seal for a rotating machine, the seal having a substrate, a bond material attached to the substrate for attaching an abradable material to the substrate, and a porous abradable material having interconnected pores of a size that creates a wicking capability for the bond material, comprising:

removing not more than a substantial portion of the abradable material leaving behind a residue of bond material and abradable material;

disposing a layer of bond material adjacent the residue;

disposing a layer of porous abradable seal material adjacent the layer of bond material such that the layer of bond material is disposed between the residue and the seal material; and liquefying the bond material such that at least a portion of the bond material is drawn into the abradable seal material and the bond material of the layer is joined to the bond material of the residue.

2. The process for repairing an abradable seal for a rotating machine of claim 1 wherein the bond material is a braze material.

3. The process for repairing an abradable seal for a rotating machine of claim 1 wherein the step of removing the abradable material employs a pressurized jet of liquid and the residue covers the entire surface of the substrate.

4. A process for repairing an abradable seal for a gas turbine engine, the seal having a substrate, a bond material attached to the substrate for attaching an abradable material to the substrate, and a porous abradable material having interconnected pores of a size that creates a wicking capability for the bond material, comprising:

removing not more than a substantial portion of the abradable material, leaving behind a residue of bond material and abradable material, the residue having an average thickness $R_r$ at a circumferential section measured perpendicular to the substrate;

disposing a layer of bond material adjacent the residue, the bond material layer having an average thickness $R_b$ at a circumferential section measured perpendicular to the substrate wherein the average thickness of the bond layer $R_b$ is not greater than twice the average thickness $R_r$ of said residue;

disposing a layer of porous abradable material adjacent the layer of bond material such that the layer of bond material is disposed between the residue and the layer of abradable material; and liquefying the bond material such that at least a portion of the bond material is drawn into the abradable material and the bond material of the layer is joined to the bond material of the residue.

5. The process for repairing an abradable seal for a gas turbine engine of claim 4 wherein the bond material is a braze material.

6. The process for repairing an abradable seal for a gas turbine engine of claim 4 wherein the step of removing the abradable material employs surface abrasive machining and the amount of substrate removed at any location is less than twenty (20) percent of the thickness of the abradable seal material prior to the step of removing the abradable seal material.

7. The process for repairing an abradable seal for a gas turbine engine of claim 4 wherein the step of removing the abradable material employs a pressurized jet of liquid and the residue covers the entire surface of the substrate.

* * * * *